(12) United States Patent
Nakamura

(10) Patent No.: US 8,655,863 B2
(45) Date of Patent: Feb. 18, 2014

(54) SEARCH DEVICE, SEARCH SYSTEM, SEARCH DEVICE CONTROL METHOD, SEARCH DEVICE CONTROL PROGRAM, AND COMPUTER-READABLE RECORDING MEDIUM

(75) Inventor: Masakatsu Nakamura, Kashihara (JP)

(73) Assignee: Sharp Kabushiki Kaisha, Osaka (JP)

( * ) Notice: Subject to any disclaimer, the term of this patent is extended or adjusted under 35 U.S.C. 154(b) by 1369 days.

(21) Appl. No.: 12/075,091

(22) Filed: Mar. 6, 2008

(65) Prior Publication Data

US 2008/0219597 A1    Sep. 11, 2008

(30) Foreign Application Priority Data

Mar. 7, 2007    (JP) .................................. 2007-057872

(51) Int. Cl.
*G06F 7/04* (2006.01)
*G06F 17/30* (2006.01)

(52) U.S. Cl.
USPC ............ 707/708; 707/725; 707/741; 707/746

(58) Field of Classification Search
USPC ................. 707/3, 5, 104.1, 999.003, 999.005, 707/999.107, 708, 713, 723, 725, 741, 746; 382/305, 306
See application file for complete search history.

(56) References Cited

U.S. PATENT DOCUMENTS

| | | | |
|---|---|---|---|
| 5,047,868 A | 9/1991 | Takeda et al. | |
| 5,165,103 A | 11/1992 | Takeda et al. | |
| 6,424,429 B1 | 7/2002 | Takahashi et al. | |
| 7,298,520 B2 * | 11/2007 | Ohkubo et al. | 358/1.18 |
| 7,421,154 B2 * | 9/2008 | Kinjo | 382/305 |
| 2004/0078389 A1 * | 4/2004 | Hamilton | 707/104.1 |
| 2005/0036168 A1 * | 2/2005 | Shoji et al. | 358/1.15 |
| 2007/0250490 A1 * | 10/2007 | Okawa | 707/3 |

FOREIGN PATENT DOCUMENTS

| | | |
|---|---|---|
| JP | 01-239630 A | 9/1989 |
| JP | 04-047366 A | 2/1992 |
| JP | 05-298368 A | 11/1993 |
| JP | 10-124525 A | 5/1998 |
| JP | 11-143907 A | 5/1999 |
| JP | 2000-276484 A | 10/2000 |
| JP | 2004-013311 A | 1/2004 |
| JP | 2006-166175 A | 6/2006 |

* cited by examiner

*Primary Examiner* — Bruce Moser
(74) *Attorney, Agent, or Firm* — Edwards Wildman Palmer LLP; David G. Conlin; David A. Tucker

(57) ABSTRACT

A search device includes a first search section and a second search section. The first search section searches, for second image data sharing a common attribute with first image data being processed by an image processing apparatus, a storage section in which image data processed by the image processing apparatus is stored. The second search section searches the storage section for third image data processed by the image processing apparatus within a time period from a predetermined time before a reference time to a predetermined time after the reference time, the reference time being a point of time at which the second image data was processed by the image processing apparatus. This makes it possible to prevent a search omission in the search device for searching for the second image data sharing a common attribute with the first image data.

16 Claims, 8 Drawing Sheets

FIG. 2

| USER ID | DOCUMENT ID | KEYWORD | FORMAT INFORMATION | PROCESSING TIME INFORMATION | PROCESSING CONTENT INFORMATION | SECURITY INFORMATION |
|---|---|---|---|---|---|---|
| 001 TANAKA | 001 | GOLF COMPETITION | | 10:00 10.30.06 | SCAN | ← β |
| | 003 | XX Gr | WEEKLY REPORT | 10:05 10.30.06 | PRINT | |
| | 006 | MAP OF XX CITY | | 11:01 10.30.06 | FAX | |
| | 008 | WELCOME PARTY | | 11:01 10.30.06 | FAX | |
| 002 IGUCHI | 001 | GOLF COMPETITION | | 9:00 10.29.06 | PRINT | ← γ |
| | 002 | GOLF GEAR ADVERTISEMENT | | 9:01 10.29.06 | PRINT | ← α |
| | 013 | YY MTG | NOTICE OF MEETING | 16:00 10.28.06 | PRINT | ← μ |
| | 017 | LECTURE MEETING | RESUME | 14:00 01.10.06 | PRINT | |
| | 018 | LECTURER | PROFILE | 14:01 01.10.06 | PRINT | |
| 003 YOSHIDA | 009 | YY MTG | NOTICE OF MEETING | 10:31 10.28.06 | PRINT | ← φ |
| | 010 | MTG MATERIAL | | 10:32 10.28.06 | PRINT | ← ε |
| | | ... | | | | SECURITY REQUIRED |
| | 011 | WELCOME PARTY FOR MR. YY | | 12:00 10.30.06 | COPY | |
| 004 ETOH | | ... | | | | |

FIG. 6 (a)

INVITATION TO MEETING

| MEETING AGENDA | YY MTG |
| --- | --- |
| DATE AND HOUR | 11.1.06 |
| TARGET PARTICIPANTS | XX YY ZZ |
| CONTENTS | ... ... ... |

FIG. 6 (b)

YY MTG PRELIMINARY MATERIAL

SURVEY CONTENT

INVITATION TO GOLF COMPETITION

GOLF COMPETITION WILL BE HELD. ACTIVE PARTICIPATION IS REQUIRED.

DATE AND HOUR: M/D/Y
PLACE: YAEZAKURA GOLF COUNTRY CLUB
PARTICIPATION FEES: ¥10,000-

HELD EVEN IF IT RAINS

GOLF GEAR AT A LOW PRICE

1. GOLF WEAR    ¥XXX-

2. GOLF CLUB

⋮

GOLF GEAR YY SHOP

FIG. 8

|  | | DOCUMENT ID | | | | |
|---|---|---|---|---|---|---|
|  | | 001 | 002 | 003 | 004 | 005 |
| USER ID | 001 | ○ | ○ |  | ○ |  |
|  | 002 | ○ |  | ○ |  | ○ |
|  | 003 | ○ |  | ○ | ○ |  |
|  | 004 |  | ○ | ○ |  | ○ |
|  | 005 | ○ |  |  |  |  |

SEARCH DEVICE, SEARCH SYSTEM, SEARCH DEVICE CONTROL METHOD, SEARCH DEVICE CONTROL PROGRAM, AND COMPUTER-READABLE RECORDING MEDIUM

This Nonprovisional application claims priority under 35 U.S.C. §119(a) on Patent Application No. 57872/2007 filed in Japan on Mar. 7, 2007, the entire contents of which are hereby incorporated by reference.

FIELD OF THE INVENTION

The present invention relates to a search device, a search system, a search device control method, a search device control program, and a computer-readable recording medium for searching for predetermined image data in a storage device in which image data are stored.

BACKGROUND OF THE INVENTION

Conventionally, there have been proposed a large number of search devices or search systems for searching for predetermined image data in a storage device in which image data are stored. For example, each of Patent Documents 1 to 3 listed below discloses such a technique that when a keyword by which a search process is performed has been entered, an electronic document related to the keyword is retrieved from among electronic documents (image data) stored in a storage device.

Further conventionally known as a search technique different from such a technique is a "similarity search" (one example of which is described in Paragraphs [0003] and [0004] of Patent Document 4 listed below). According to the similarity search, in cases where an electronic document A by which a search process is performed has been entered or designated, an electronic document B judged to share a common attribute with (to be similar to) the electronic document A is retrieved from a storage device.

The following fully describes the similarity search. In a database system to which the similarity search is applied, all electronic documents are associated with keywords indicative of attributes of the electronic documents, respectively. Then, in cases where an electronic document A by which a search process is performed has been entered or designated, an electronic document B associated with a keyword identical to a keyword associated with the electronic document A is retrieved from a storage device.

In the database system to which the similarity search is applied, there are various ways of selecting a keyword that is associated with an electronic document. For example, there is such a technique that a group of relatively large font characters contained in an electronic document, a group of special font characters contained in an electronic document, or a group of characters contained in the first item and uppermost line of an electronic document is selected as a keyword that is associated with the electronic document. Alternatively, there is such a technique that in generating an electronic document by scanning, a group of relatively large font characters or the like is selected as a keyword from among groups of characters recognized by a character recognition technique such as OCR (optical character reader). These techniques make it possible that the title of an electronic document or a word particularly emphasized in the electronic document is selected as a keyword that is associated with the electronic document. For example, in the case of an electronic document named "Guide to a Ski Tour", words such as "ski", "tour", and "guide" can be selected as keywords.

Patent Document 1

Japanese Unexamined Patent Application Publication No. 191272/1988 (Tokukaisho 63-191272; published on Aug. 8, 1988)

Patent Document 2

Japanese Unexamined Patent Application Publication No. 239630/1989 (Tokukaihei 01-239630; published on Sep. 25, 1989)

Patent Document 3

Japanese Unexamined Patent Application Publication No. 047366/1992 (Tokukaihei 04-047366; published on Feb. 17, 1992)

Patent Document 4

Japanese Unexamined Patent Application Publication No. 124525/1998 (Tokukaihei 10-124525; published on May 15, 1998)

Patent Document 5

Japanese Unexamined Patent Application Publication No. 298368/1993 (Tokukaihei 05-298368; published on Nov. 12, 1993)

Incidentally, as typical examples of image processing apparatus that processes such electronic documents as described above, there have been conventionally known multi function printers (i.e., apparatuses having functions of copiers, printers, scanners, and the like). In the field of multi function printers, a management server has been practically used which is communicably connected to a plurality of multi function printers and which sequentially stores, in a storage device, electronic documents processed by the multi function printers.

In view of this, if the similarity search is applied to the management server so that the management server (i) searches the storage device for an electronic document D sharing a common attribute with an electronic document C being processed by a multi function printer for the purpose of print processing and (ii) controls the multi function printer so that the multi function printer prints not only a document that is based on the electronic document C but also a document that is based on the electronic document D, a user is allowed to obtain not only a document that the user recognizes as a target for printing but also another document that contains information related to the document. This brings about a merit of being able to acquire a wide range of information.

That is, in cases where someone printed a related document related to a print target document that the user is about to print, an electronic document corresponding to the related document is already stored in the storage device by the management server. In this case, the management server can retrieve the related document by searching through documents sharing a common attribute with the print target document, with the result that the print target document and the related document are printed by the multi function printer.

For example, if a user operates a terminal device to send a multi function printer a command to print an electronic document E named "Invitation to a Lecture Meeting" indicative of the date of a lecture meeting, the multi function printer tries to execute a print operation that is based on the electronic document E. In this case, a management server connected to the multi function printer selects "lecture meeting" as keywords that are associated with the electronic document E, searches through electronic documents on the keywords "lecture meeting", and retrieves, as a result of the search, an electronic document F named "Resume of a Lecture Meeting" indicative of a summary of the content of the lecture meeting. This causes the multi function printer to print not only a document "Invitation to a Lecture Meeting" that is based on the electronic document E but also a document "Resume of a Lecture Meeting" that is based on the electronic document F. This enables the user to unexpectedly obtain the document "Resume of a Lecture Meeting" indicative of the summary of the content of the lecture meeting while obtaining the document "Invitation to a Lecture Meeting" indicative of the date of the lecture meeting. This offers the user a merit of being able to unexpectedly know the summary of the content of the lecture meeting and a merit of being able to save himself/ herself the trouble of separately obtaining the "Resume of a Lecture Meeting".

As described above, in cases where the similarity search is applied to the aforementioned management server, it is possible to search for an electronic document sharing a common attribute with an electronic document being processed by a multi function printer for the purpose of print processing. However, there may be an omission in such a search. The following fully describes such an omission.

In order to search a storage device for an electronic document sharing a common attribute with an electronic document H being processed by a multi function printer for the purpose of print processing, a management server to which the similarity search is applied as described above tries to search the storage device for an electronic document associated with a keyword identical to a keyword associated with the electronic document H.

For this reason, even if an electronic document G stored in the storage device is relevant in content to the electronic document H, the electronic document G is not retrieved as a result of a search process of the management server in cases where the electronic document G is not identical in keyword to the electronic document H. This causes an omission in the search.

For example, if a user operates a terminal device to send a multi function printer a command to print an electronic document E named "Invitation to a Lecture Meeting" indicative of the date of a lecture meeting, the multi function printer tries to execute a print operation that is based on the electronic document E. Then, a management server connected to the multi function printer selects "lecture meeting" as keywords that are associated with the electronic document E, and uses the keywords "lecture meeting" to search for an electronic document sharing a common attribute with the electronic document E. At the same time, assume that an electronic document F named "Resume of a Lecture Meeting" indicative of a summary of the content of the lecture meeting and an electronic document I named "Profile of a Lecturer" that introduces a lecturer of the lecture meeting are stored in a storage device of the management server so as to be associated with keywords "lecture meeting" and a keyword "lecturer", respectively. In this case, since the management server performs a search on the keywords "lecture meeting", the management server can retrieve the electronic document F, but cannot retrieve the electronic document I related in content to the electronic document E. This causes an omission in the search.

SUMMARY OF THE INVENTION

It is an object of the present invention to prevent an omission in a search performed by a search device for searching for a second image sharing a common attribute with a first image.

Image data b processed by an image processing apparatus at the same time or at substantially the same time as image data a was processed by the image processing apparatus is often has relevant to the image data a. This is because a user of the image processing apparatus often operates the image processing apparatus so that the image processing apparatus processes plural pieces of image data related in content to one another. For example, assume that an organizer of a Christmas party operates the multi function printer so that the multi function printer performs a process of printing a document "Invitation to a Christmas Party" onto a sheet of paper in accordance with image data indicative of the document. Then, immediately before or after (at substantially the same time as) the process, the organizer is likely to operate the multi function printer so that the multi function printer performs a process of printing a map of a site of the Christmas party onto a sheet of paper in accordance with image data indicative of the map.

In view of this, an search device of the present invention include: a first search section for searching, for second image data sharing a common attribute with first image data, a storage section in which image data processed by an image processing apparatus is stored; and a second search section for searching the storage section for third image data processed by the image processing apparatus within a time period from a predetermined time before a reference time to a predetermined time after the reference time, the reference time being a point of time at which the second image data was processed by the image processing apparatus.

That is, according to the arrangement of the present invention, the search device having the first search section for searching for the second image data sharing a common attribute with the first image data has the second search section for searching for the third image data (i.e., the image data highly likely to be relevant to the second image data) processed by the image processing apparatus at the same time or at substantially the same time as the second image data was processed by the image processing apparatus.

This may make it possible not only to retrieve the second image data sharing a common attribute with the first image data, but also to retrieve the third image data highly likely to be relevant to the second image data. Since the second image data shares a common attribute with the first image data, the third image data highly likely to be relevant to the second image data is highly likely to also share a common attribute with the first image data.

Therefore, in such a case where although the first search section has extracted the second image data sharing a common attribute with the first image data, there is actually an omission in the search performed by the first search section, the second search section may be able to extract the third image data highly likely to be relevant to the second image data. This makes it possible to prevent a search omission.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 2 shows an example of a management table that gives a description of management information related to each piece of image data saved in the management server.

FIG. 6(a) shows an example of an image indicated by image data that is processed by a multi function printer of the present embodiment.

FIG. 6(b) shows an example of an image sharing a common attribute with the image shown in FIG. 6(a).

FIG. 8 is a table that gives a description of correspondence between a document ID associated with image data used for print processing and a user ID of a user who operated the multi function printer in accordance with the image data.

DESCRIPTION OF THE EMBODIMENTS

Figure 1:
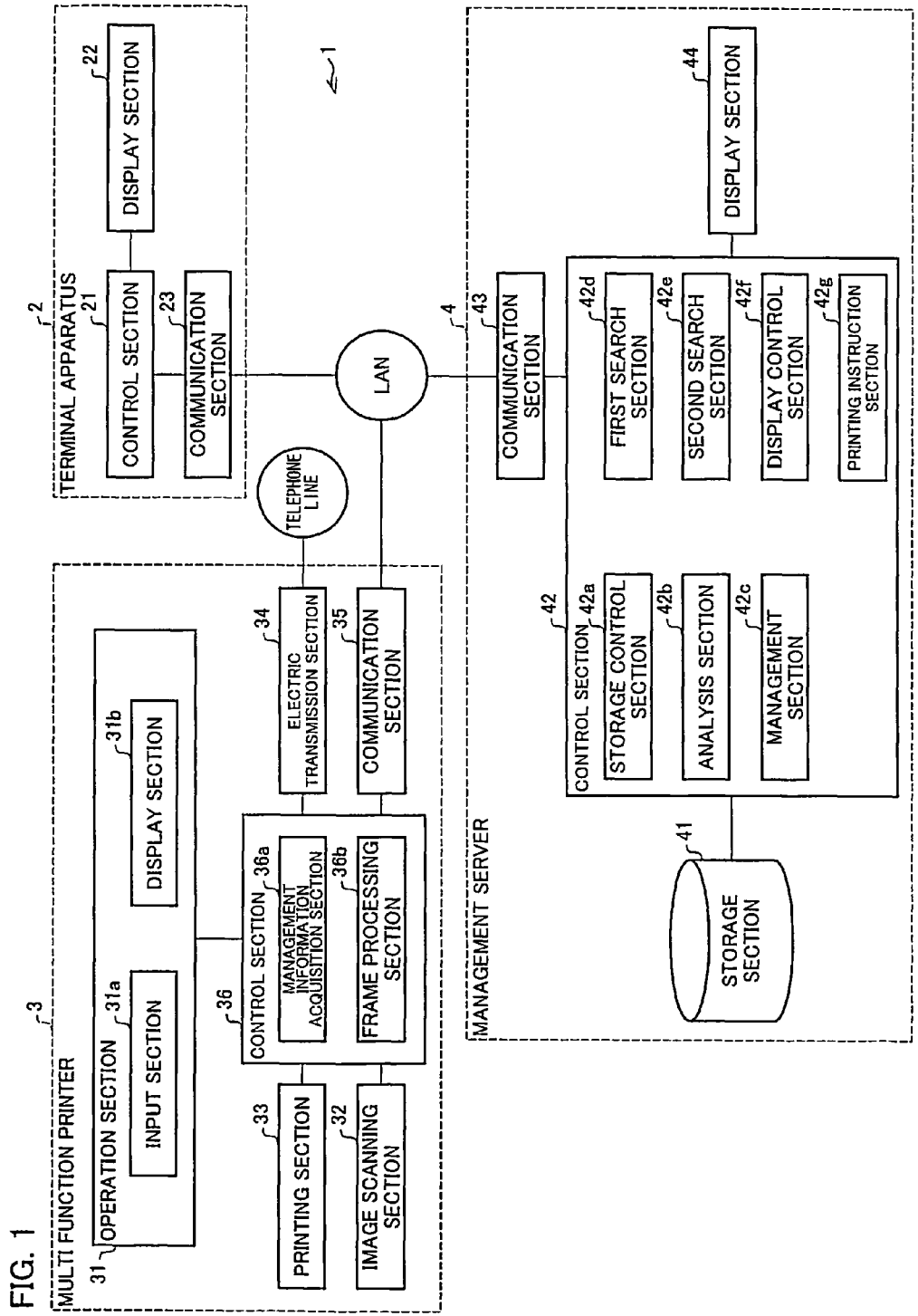
FIG. 1 is a block diagram showing a management server, which is an embodiment of a search device of the present invention, and a printing system including the management server.

A management server, which is an embodiment of a search device of the present invention, will be described below with reference to the drawings. FIG. 1 is a block diagram showing an arrangement of a printing system including a management server of the present embodiment.

As shown in FIG. 1, the printing system (search system) 1 is arranged such that a terminal device 2, a multi function printer (MFP) 3, and a management server 4 are connected to a LAN (local area network). That is, in the printing system 1, the terminal device 2, the multi function printer 3, and the management server 4 can perform data communication with one another via the LAN.

The terminal device 2 is a user terminal that is used by a user of the printing system 1. The terminal device 2 is a personal computer that contains, in addition to various types of software such as word-processing software, spreadsheet software, drawing software, and image-editing software, a printer driver for remotely controlling the multi function printer 3. Specifically, the terminal device 2 includes a control section 21, a display section 22, and a communication section 23.

Further, although FIG. 1 shows only one terminal device 2 for simplicity of explanation, the printing system 1 actually includes a plurality of terminal devices 2.

The control section 21 is a computer's main unit that executes processes by the various types of software and the printer driver. That is, the control section 21 creates and processes image data by the various types of software in accordance with a command given from the user, sets printing conditions for the multi function printer 3 by the printer driver, and transmits the created and processed image data to the multi function printer 3, thereby controlling the multi function printer 3 so that the multi function printer 3 prints an image that is based on the image data.

The term "image data" here means: an image file indicative of a document, a drawing, a table, a map, a picture, and a pattern; an image taken by a camera; and an image file scanned by a scanner.

The display section 22 is an image display device that displays various images related to the various types of software or the printer driver and various images related to the printing system 1. The communication section 23 is a communication interface for the terminal device 2 to communicate various types of data to the multi function printer 3 or the management server 4 via the LAN.

The multi function printer (image processing apparatus) 3 is an apparatus, constituted integrally by a printer, a facsimile machine, a scanner, and a control device, which performs a plurality of functions such as copying, scanning, printing, data transmission, and facsimile. Specifically, the multi function printer 3 includes an operation section 31, an image scanning section 32, a printing section 33, an electric transmission section 34, a communication section 35, and a control section 36.

The operation section 31 is an operation panel for the user to directly operate the multi function printer 3. The operation section 31 includes an input section 31a and a display section 31b for the user to input various commands to the multi function printer 3. The input section 31a is a keyboard, and the display section 31b is a touch screen. Further, the display section 31b displays, in addition to an image that prompts the user to input various commands to the multi function printer 3, an image that is based on image data transmitted from the management server 4.

The image scanning section 32 is a scanner that scans an image of an original document by a CCD (charge-coupled device) and generates image data indicative of the image of the original document. The printing section 33 is an electrophotographic color or monochrome printer that prints an image onto a sheet of paper.

The electric transmission section 34 is a communication interface for the multi function printer 3 to perform facsimile communication with an external device by making a connection to a telephone line. Although the electric transmission section 34 performs facsimile communication via a telephone line in the present embodiment, the electric transmission section 34 may perform facsimile communication via the Internet.

The communication section 35 is a communication interface for the multi function printer 3 to perform data communication with the terminal device 2 or the management server 4 via the LAN.

The control section 36 is a computer that exercises control over all the components of the multi function printer 3 in accordance with a command given from the user and thereby controls the multi function printer 3 so that the multi function printer 3 executes an image scanning mode, a copy mode, a print mode, a FAX transmission mode, and a FAX reception mode.

In the image scanning mode, the image scanning section 32 generates image data by scanning an image of an original document, and the image data thus generated is transmitted to the management server 4 and then saved in a storage section 41 of the management server 4. In the copy mode, the printing section 33 prints, onto a sheet of paper, an image based on image data scanned by the image scanning section 32. In the print mode, the printing section 33 prints, onto a sheet of paper, an image based on image data sent from the terminal device 2. In the FAX transmission mode, the electric transmission section 34 performs facsimile communication, thereby transmitting, to an external device, image data scanned by the image scanning section 32. In the FAX reception mode, the printing section 33 prints, onto a sheet of paper, an image based on image data that the electric transmission section 34 has received from an external device.

Further, in addition to the execution of the image scanning mode, the copy mode, the print mode, the FAX transmission mode, and the FAX reception mode, the control section 36 performs a control process of transmitting, to the management server 4, image data being processed by the multi function printer 3 while one of the modes is being executed.

That is, even in cases where a mode other than the image scanning mode is being executed, image data being processed by the multi function printer 3 is transmitted to the management server 4. In the image scanning mode, image data scanned by the image scanning section 32 is transmitted to the management server 4. Therefore, in the image scanning mode, image data being processed by the multi function printer 3 is inevitably transmitted to the management server 4.

Specifically, image data scanned by the image scanning section 32 while the copy mode is being executed by the multi function printer 3 is not only inputted to the printing section 33, but, also transmitted to the management server 4. Further, image data scanned by the image scanning section 32 while the FAX transmission mode is being executed by the multi function printer 3 is transmitted to the management server 4 as well as the electric transmission section 34. Furthermore, image data received by the electric transmission section 34 while the FAX reception mode is being executed by the multi function printer 3 is not only inputted to the printing section 33, but also transmitted to the management server 4. Further, image data transmitted from the terminal device 2 while the print mode is being executed by the multi function printer 3 is not only inputted to the printing section 33, but also transmitted to the management server 4.

The management server (document filing apparatus, search device) 4 is a computer for saving and managing image data processed by the multi function printer 3, i.e., image data transmitted from the multi function printer 3. The management server 4 includes a storage section 41, a control section 42, a communication section 43, and a display section 44.

The storage section 41 is a storage device to which image data being processed by the multi function printer 3 are sequentially written and in which a management table (see FIG. 2) indicative of management information for managing the image data is written. That is, in the storage section 41, image data processed by the multi function printer 3 is stored and saved.

The control section 42 is a computer that controls the management server 4. For example, the control section 42 performs the following processes: (a) a process of managing each piece of image data saved in the storage section 41; (b) a process of writing image data to the storage section 41; (c) a process of reading out image data from the storage section 41; (d) a process of deleting image data from the storage section 41; and (e) a process of searching the storage section 41 for image data.

The communication section 43 is a communication interface for the management server 4 to perform data communication with the terminal device 2 or the multi function printer 3 via the LAN.

The display section 43 is a display device that shows, to an operator who is operating the management server 4, various images related to the management server 4.

Furthermore, in the printing system 1 thus described, the control section 36 of the multi function printer 3 includes a management information acquisition section 36a and a frame processing section 36b. Furthermore, the control section 42 of the management server 4 includes a storage control section 42a, an analysis section 42b, a management section 42c, a first search section 42d, a second search section 42e, a display control section 42f, and a printing instruction section 42g.

The management information acquisition section 36a of the multi function printer 3 acquires management information that is associated with image data being processed by the multi function printer 3 while one of the image scanning mode, the FAX transmission mode, the FAX reception mode, the copy mode, and the print mode is being executed. The management information is information necessary for the management server 4 to manage the image data being processed by the multi function printer 3. The management information means a document ID, a user ID, processing time information, processing content information, and security information that are associated with the image data (see FIG. 2). The following fully describes the document ID, the user ID, the processing time information, the processing content information, and the security information.

The document ID (image identification information) is identification information capable of identifying an image indicated by the image data being processed by the multi function printer 3, and means information given uniquely to the image data. Examples of the document ID include a hash value, which can be acquired from the image data by executing an algorithm such as MD5.

In the image scanning mode, the FAX transmission mode, or the copy mode, the user ID (user information) serves as a user ID of a user who is using the multi function printer 3. A user who is going to use the multi function printer 3 in the image scanning mode, the FAX transmission mode, or the copy mode is required to input an user ID in advance via the operation section 31, and the management information acquisition section 36a acquires the user ID from the operation section 31.

Further, in the print mode, the user ID serves as a user ID indicative of a user of the terminal device 2. That is, in the print mode, in response to image data transmitted from the terminal device 2, the management information acquisition section 36a acquires, from the terminal device 2 or the like, a user ID of the terminal device 2 from which the image data has been transmitted.

Furthermore, in the FAX reception mode, the user ID serves as an owner ID indicative of an owner of the multi function printer 3. That is, in the FAX reception mode, the management information acquisition section 36a reads out an owner ID of the multi function printer 3 from a memory or the like (not shown) and acquires the owner ID as the user ID. The owner of the multi function printer 3 corresponds, for example, to a corporation that owns the printing system 1 or a department or section belonging to the corporation.

The processing time information indicates a point of time at which the image data with which the processing time information is associated was processed by the multi function printer 3. For example, the management information acquisition section 36a may acquire, as the processing time information, a point of time at which the image data is being processed by the multi function printer 3. Further, in the image scanning mode, the FAX transmission mode, or the copy mode, the management information acquisition section 36a may acquire, as the processing time information, a point of time at which the image data was scanned by the image scanning section 32. Further, in the FAX reception mode, the management information acquisition section 36a may acquire, as the processing time information, a point of time at which the electric transmission section 34 received the image data. Furthermore, in the print mode, the management information acquisition section 36a may acquire, as the processing time information, a point of time at which the image data was transmitted from the terminal device 2.

The processing content information indicates the content of a process that is performed by the multi function printer 3 with respect to the image data with which the processing content information is associated. For example, the management information acquisition section 36a acquires "SCAN" as processing content information in the image scanning mode, acquires "FAX transmission" as processing information in the FAX transmission mode, acquires "FAX reception" as processing information in the FAX reception mode, acquires "COPY" as processing content information in the copy mode, and acquires "PRINT" as processing content information in the print mode.

Further, the security information indicates whether or not the image data with which the security information is associated requires security. A user who is going to operate the multi function printer 3 in the image scanning mode, the FAX transmission mode, or the copy mode can input a command indicative of the necessity of security via the operation section 31. In cases where the command is inputted, the management information acquisition section 36a acquires security information indicative of "SECURITY REQUIRED".

Further, in the print mode, before transmitting image data from the terminal device 2 to the multi function printer 3, a user of the terminal device 2 can input a command indicative of the necessity of security for the image data to the terminal device 2. The command thus inputted is transmitted to the multi function printer 3 together with the image data. In the print mode, in cases where the command is detected, the management information acquisition section 36a of the multi function printer 3 acquires security information indicating "SECURITY REQUIRED".

The frame processing section 36b of the multi function printer 3 performs a control process of: creating a transmission frame containing image data being processed by the multi function printer 3; describing, in a portion of the transmission frame other than the image data (e.g., in a header portion), the management information acquired by the management information acquisition section 36a; and transmitting the transmission frame to the management server 4 via the communication section 35. With this, the image data being processed by the multi function printer 3 and the management information (document ID, user ID, processing time information, processing content information, security information) related to the image data are transmitted to the management server 4.

The storage control section 42 of the management server 4 is a block which, when the communication section 43 receives the transmission frame transmitted from the multi function printer 3, performs a process of writing, to the storage section 41, the image data contained in the transmission frame. With this, image data being processed by the multi function printer 3 are sequentially written to the storage section 41. Therefore, image data processed by the multi function printer 3 is saved in the storage section 41.

When the communication section 43 receives the transmission frame transmitted from the multi function printer 3, the analysis section 42b of the management server 4 analyzes the image data contained in the transmission frame, thereby generating a keyword indicative of an attribute of the image data and generating format information indicative of the format of an image indicated by the image data.

In cases where the image data is an electronic document, the keyword is generated, for example, by a technique for selecting, as the keyword, a group of relatively large font characters contained in the electronic document, a group of special font characters contained in the electronic document, or a group of characters contained in the first item and uppermost line of the electronic document. Alternatively, in cases where the image data is an image file such as a photographic image, the file name of the image file can be selected as the keyword.

Further, for example, the format information is represented as "weekly report" in cases where the format of the image indicated by the image data is a weekly report, represented as "notice of meeting" in cases where the format of the image indicated by the image data is a notice of meeting, and represented as "report" in cases where the format of the image indicated by the image data is a report.

The management section 42c of the management server 4 creates and processes a management table that keeps, for each piece of image data processed by the multi function printer 3, a record of correspondence among a document ID, processing time information, processing content information, security information, a keyword, and format information each corresponding to the image data. Further, the management table is written in the storage section 41. FIG. 2 shows an example of the management table. As shown in FIG. 2, in the management table, such correspondence as described above is shown for each piece of image data and classified according to each user.

Specifically, when the communication section 43 receives the transmission frame transmitted from the multi function printer 3, the management section 42c describes, in the management table, a combination of the document ID, the processing time information, the processing content information, and the security information each described in the transmission frame. Furthermore, the management section 42c describes, in the management table, the keyword generated by the analysis section 42 and the format information, so that the keyword and the formation information are associated with the combination.

Therefore, the management table saved in the storage section 41 keeps, for each piece of image data processed by the multi function printer 3 (i.e., for each piece of image data saved in the storage section 41), a record of a document ID, processing time information, processing content information, security information, a keyword, and format information that are associated with the image data.

The first search section (first search means) 42d of the management server 4 performs a process of searching the storage section 41 for image data (second image data) sharing a common attribute with image data (first image data) being processed by the multi function printer 3, and performs a process of specifying, as related image data, image data retrieved from the storage section 41 as a result of this search. The term "related image data" here means image data related to the image data being processed by the multi function printer 3.

Specifically, when the analysis section 42b generates a keyword, the first search section 42d performs a process of searching the storage section 41 for image data associated with an keyword identical to the keyword generated by the analysis section 42b. The "keyword generated by the analysis section 42b" here means a keyword that is associated with the image data contained in the transmission frame received from the multi function printer 3, i.e., a keyword that is associated with the image data being processed by the multi function printer 3. Moreover, the "keyword that is associated with the image data" here means a keyword indicative of an attribute of the image data. This means that the first search section 42*d* searches the storage section 41 for image data sharing a common attribute with the image data being processed by the multi function printer 3.

More specifically, the first search section 42*d* refers to the management table (FIG. 2) of the storage section 41 and searches for a keyword identical to the keyword generated by the analysis section 42*b*. In cases where the first search section 42*d* has successfully detected such a keyword, the first search section 42*d* retrieves image data whose document ID corresponds to the keyword thus detected. For example, assume that the analysis section 42*b* has generated keywords "lecture meeting" in accordance with image data contained in a transmission frame received from the multi function printer 3. In this case, the first search section 42*d* refers to the management table (FIG. 2) of the storage section 41, detects the keywords "lecture meeting" contained in the management table, and retrieves image data whose document ID ("017" in FIG. 2) corresponds to the keywords "lecture meeting" thus detected.

Further, when the analysis section 42*b* generates format information, the first search section 42*d* performs a process of searching the storage section 41 for image data associated with format information identical to the format information generated by the analysis section 42*b*. The "format information generated by the analysis section 42*b*" here means format information that is associated with the image data contained in the transmission frame received from the multi function printer 3, i.e., format information that is associated with the image data being processed by the multi function printer 3. Moreover, the "format information that is associated with image data" here means information indicative of a format of the image data. This means that the first search section 42*d* searches the storage section 41 for image data indicative of an image identical in format to an image indicated by the image data being processed by the multi function printer 3. As a result, this means that the first search section 42*d* searches the storage section 41 for the image data (second image data) sharing a common attribute with the image data (first image data) being processed by the multi function printer 3.

The second search section (second search means) 42*e* of the management server 4 searches the storage section 41 for image data processed by the multi function printer 3 at the same time or at substantially the same time as image data retrieved as a result of a search performed by the first search section 42*d*, and specifies, as related image data, image data retrieved as a result of this search.

That is, the second search section 42*e* searches the storage section 41 for image data (third image data) processed by the multi function printer 3 within a time period from a predetermined time before a reference time to a predetermined time after the reference time, the reference time being a point of time at which the image data (second image data) retrieved by the first search section 42*d* was processed by the multi function printer 3. In this specification, the phrase "predetermined time" means the "predetermined time and a time shorter than the predetermined time" or a "time shorter than the predetermined time".

Specifically, the second search section 42*e* of the management server 4 refers to the management table of FIG. 2 and searches for processing time information falling within a time range between a point of time at which the predetermined period time has elapsed since a reference time and a point of time to which the predetermined period of time extends back from the reference time, the reference time being processing time information associated with the document ID of the image data retrieved by the first search section 42*d*. The present embodiment assumes that the predetermined period of time is one minute.

Moreover, in cases where the second search section 42*e* has successfully detected such processing time information, the second search section 42*e* retrieves image data whose document ID corresponds to the processing time information thus detected. For example, in the management table of FIG. 2, in cases where the document ID of the image data retrieved as a result of the search performed by the first search section 42*d* is "017", the second search section 42*e* sets, as a reference time, the processing time information (14:00 01.10.06) associated with the document ID "017". Then, the second search section 42*e* searches the management table of FIG. 2 for time processing information falling within a time range of 13:59 01.10.06 to 14:01 01.10.06. As a result, the second search section 42*e* detects the processing time information (14:01 01.10.06) associated with the document ID "018" and retrieves image data, associated with the processing time information thus detected, whose document ID is "018".

The display control section (image providing means, display control means) 42*f* performs a process of showing, to a user who is using the multi function printer 3, an image based on related image data specified by the first search section 42*d* and the second search section 42*e* (i.e., image data retrieved as a result of a search).

Specifically, in cases where the copy mode, the FAX transmission mode, the FAX reception mode, or the image scanning mode is being executed by the multi function printer 3, a user of the multi function printer 3 is often in front of the operation section 31. Therefore, in the copy mode, the FAX transmission mode, the FAX reception mode, or the image scanning mode, the display control section 42*f* accesses the display section 31*b* provided in the operation section 31 of the multi function printer 3 and controls the display section 31*b* so that the display section 31*b* displays the image that is based on the related image data.

Further, in cases where the print mode is being executed by the multi function printer 3, a user of the multi function printer 3 is often in front of the terminal device 2. Therefore, in the print mode, the display control section 42*f* accesses the display section 22 of the terminal device 2 and controls the display section 22 so that the display section 22 displays the image that is based on the related image data.

When a related-document print command inputted from the multi function printer 3 or terminal device 2 by the user is transmitted to the management server 4 while the display section 31*b* or 22 is displaying the image that is based on the related image data, the printing instruction section (image providing means, print control means) 42*g* performs a process of transmitting, to the multi function printer 3, a print job indicative of a printing instruction to print the image that is based on the related image data.

Figure 3:
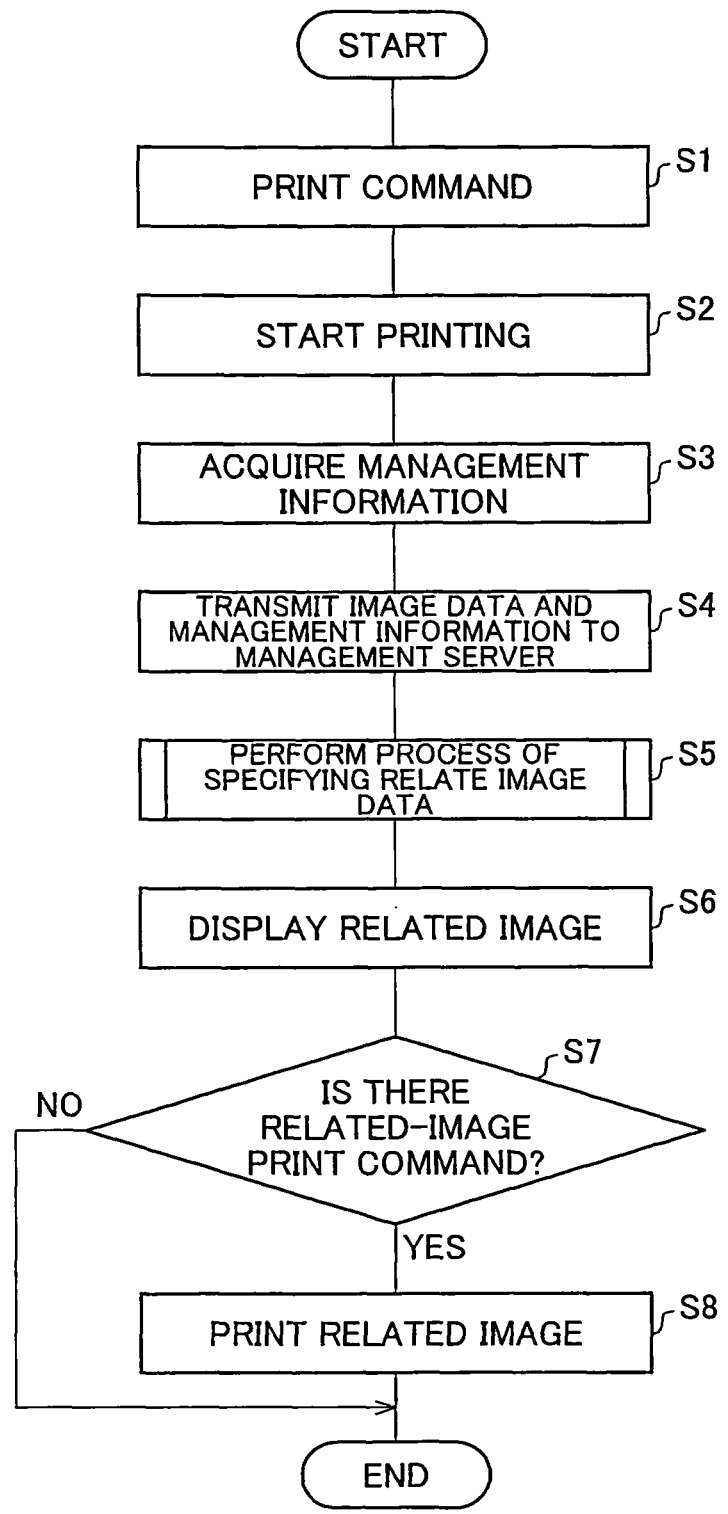
FIG. 3 is a flow chart showing a flow chart showing the flow of a process of executing a print mode in the printing system of the present embodiment.

In the following, the flow of a process of executing the print mode will be described as an example of the flow of a process by which the multi function printer 3 of the present embodiment handles image data. FIG. 3 is a flow chart showing the flow of a process of executing the print mode in the printing system 1.

First, upon receiving a print command inputted by a user (S1), the terminal device 2 transmits, to the multi function printer 3, image data indicative of an image that is to be printed. Upon receiving the image data, the multi function printer 3 inputs the image data to the printing section 33, orders the printing section 33 to start a printing process (S2), and acquires management information (a document ID, a user ID, processing time information, processing content information, and security information) that is associated with the image data (S3). Then, the multi function printer 3 transmits, to the management server 4, the image data received from the terminal device 2 and the management information acquired in S3 (S4).

Upon receiving the image data and the management information from the multi function printer 3, the management server 4 performs a process (related-image-data specifying process) of specifying, from among those pieces of image data saved in the storage section 41, related image data related in content to the image data thus received (S5). Then, the management server 4 accesses the display section 22 of the terminal device 2 and controls the display section 22 so that the display section 22 displays an image that is based on the related image data specified in S5 (S6).

When a related-image print command serving as a printing instruction to print an image being displayed by the display section 22 of the terminal device 2 is inputted to the terminal device 2 by the user while the display section 22 is displaying the image that is based on the related image data, the related-image print command is transmitted from the terminal device 2 to the management server 4. When the management server 4 receives the related-image print command within a predetermined period of time after the start of processing of S6 (YES in S7), the management server 4 transmits, to the multi function printer 3, a print job for printing the image that is based on the related image data specified in S5 and controls the multi function printer 3 so that the multi function printer 3 prints the image that is based on the related image data (S8). Thereafter, the process is terminated. Alternatively, when the management server 4 does not receive the related-image print command within a predetermined period of time after the start of S6 (NO in S7), the process is terminated.

In cases where S8 is performed, the management server 4 may write, to the management table of the storage section 41, management information indicative of a record of related image data printed in the past. That is, the management server 4 may write, to the management table, correspondence among the processing content information "PRINT", the processing time information indicative of a point of time at which S8 was executed, the user ID of the terminal device 2, and the document ID of the related image data.

Figure 4:
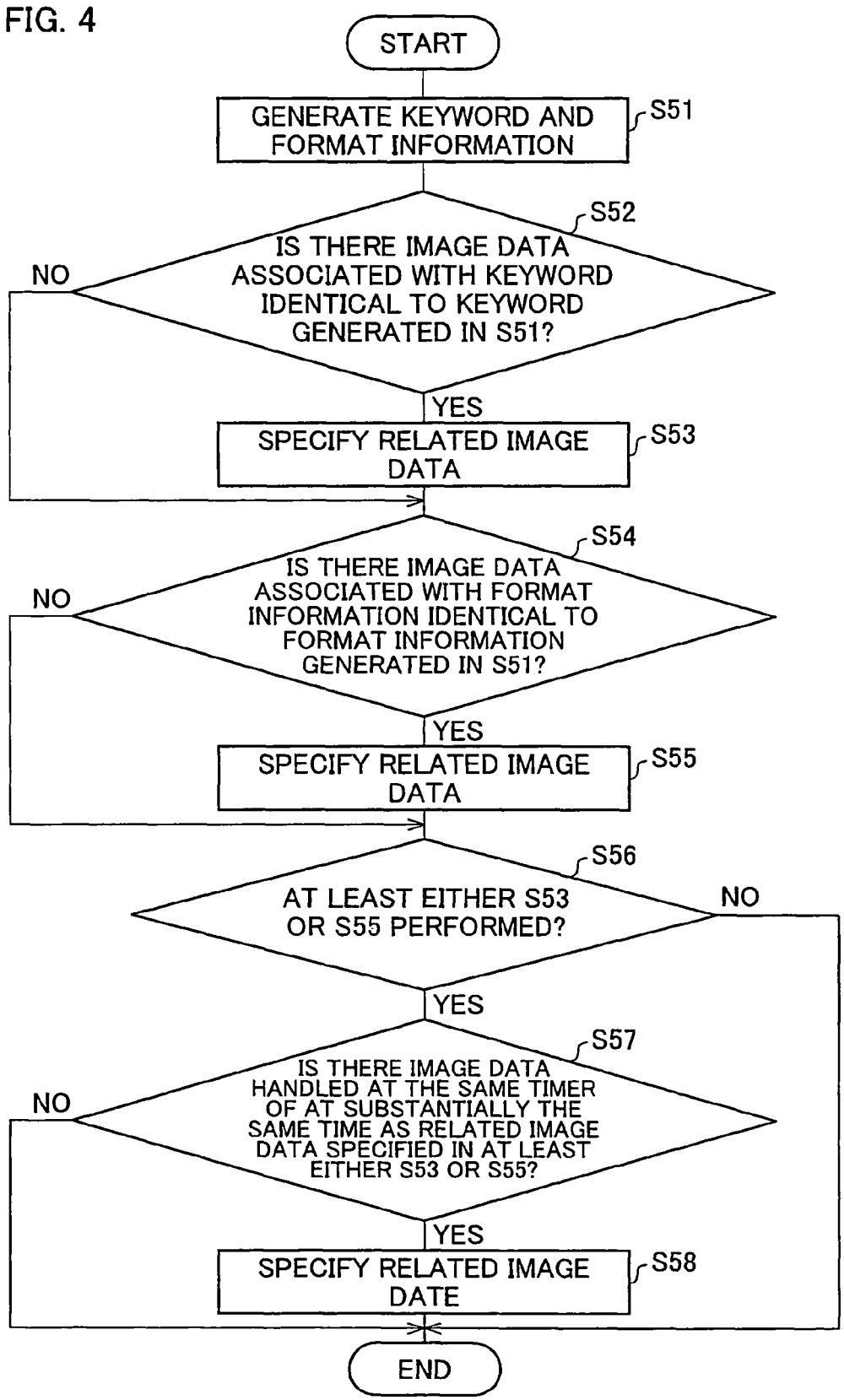
FIG. 4 is a flow chart showing a subroutine of S5 shown in FIG. 3.

In the following, the related-image-data specifying process of S5 will be fully described. FIG. 4 is a flow chart showing a subroutine of S5 shown in FIG. 3.

First, when the management server 4 receives the image data and the management information from the multi function printer 3, the analysis section 42b of the management server 4 generates a keyword and format information that are associated with the image data transmitted from the multi function printer 3 (S51). Then, the first search section 42d of the management server 4 performs a process of searching the storage section 41 for image data associated with a keyword identical to the keyword generated in S51 (S52). In cases where image data associated with a keyword identical to the keyword generated in S51 has been successfully retrieved as a result of the search performed in S52 (YES in S52), the first search section 42d specifies the retrieved image data as related image data (S53), and then shifts the process to S54. Alternatively, in cases where no image data associated with a keyword identical to the keyword generated in S51 has been retrieved as a result of the search performed in S52 (NO in S52), the first search section shifts the process directly to S54.

In S54, the first search section 42d performs a process of searching the storage section 41 for image data associated with format information identical to the format information generated in S51. In cases where image data associated with format information identical to the format information generated in S51 has been retrieved from the storage section 41 as a result of the search performed in S54 (YES in S54), the first search section 42d specifies the retrieved image data as related image data (S55), and then shifts the process to S56. Alternatively, in cases where no image data associated with format information identical to the format information generated in S51 has been retrieved from the storage section 41 as a result of the search performed in S54 (NO in S54), the first search section shifts the process directly to S56.

In S56, the second search section 42e of the management server 4 determines whether or not at least either S53 or S55 has been performed (whether or not at least one piece of related image data has been specified). In cases where at least either S53 or S55 has been performed, the process shifts to S57 (YES in S56). Alternatively, in cases where neither S53 nor S55 has been performed, the process is terminated (NO in S56).

In S57, the second search section 42e performs a process of searching the storage section 41 for image data processed by the multi function printer 3 at the same time or at substantially the same time as the related image data specified in S53 or S55. In cases where image data processed by the multi function printer 3 at the same time or at substantially the same time as the related image data specified in S53 or S55 has been retrieved as a result of the search performed in S57 (YES in S57), the second search section 42e specifies the retrieved image data as related image data (S58), and then shifts the process to S8. Alternatively, in cases where it is found, as a result of the search performed in S57, that no image data processed by the multi function printer 3 at the same time or at substantially the same time as the related image data specified in S53 or S55 is stored in the storage section 41 (NO in S57), the second search section 42e shifts the process directly to S8. That is, in S8, the management server 4 controls the display section 22 so that the display section 22 displays images that are based on the related image data specified in S53, S55, and S57.

According to the printing system 1 thus described, each piece of image data processed by the multi function printer 3 in the past is stocked in the storage section 41. Moreover, the printing system 1 performs a process of: extracting, from the storage section 41, image data related to image data being processed by the multi function printer 3; showing the user an image that is based on the image data thus extracted; and printing out the image.

This makes it possible that a user who is using the multi function printer 3 to process image data for the purpose of printing, copying, scanning, or FAX processing obtains not only the image data but also related image data related to the image data. This brings about a merit of being able to acquire a wide range of information.

Further, according to the printing system 1 thus described, although the first search section 42d of the management server 4 performs a process of searching the storage section 41 for image data sharing a common attribute with image data being processed by the multi function printer 3 (S52, S54), there may occur an omission in this search process. For example, in the case of FIG. 2 where the image data whose document ID is "017" is a resume of a lecture meeting and the image data whose document ID is "018" is a profile of a lecturer of the lecture meeting, the pieces of image data share a common attribute in that they relate to the lecture meeting, but are not identical in keyword and in format information to each other. Therefore, even when the first search section 42*d* performs a process of searching the storage section 41 for image data sharing a common attribute with the image data whose document ID is "017", the image data whose document ID is "018" is not retrieved as a result of the search despite the fact that the image data whose document ID is "017" and the image data whose document ID is "018" share a common attribute with each other. This causes an omission in the search.

In view of this, the management server 4 of the present embodiment prevents such a search omission by including, in addition to the first search section 42*d*, the second search section 42*e* for searching the storage section 41 for image data processed by the multi function printer 3 at the same time or at substantially the same time as related image data specified by the first search section 42*d*.

The following explains why such a search omission can be prevented by providing the second search section 42*e*.

Image data b processed by the multi function printer 3 at the same time or at substantially the same time as image data a was processed by the multi function printer 3 is often relevant to the image data a. This is because a user of the multi function printer 3 often operates the multi function printer 3 so that the multi function printer 3 simultaneously process plural pieces of image data related in content to one another. For example, assume that an organizer of a Christmas party operates the multi function printer 3 so that the multi function printer 3 performs a process of printing a document "Invitation to a Christmas Party" onto a sheet of paper in accordance with image data indicative of the document. Then, immediately before or after (at substantially the same time as) the process, the organizer is likely to operate the multi function printer 3 so that the multi function printer 3 performs a process of printing a map of a site of the Christmas party onto a sheet of paper in accordance with image data indicative of the map.

In view of this, according to the present embodiment, in cases where second image data sharing a common attribute with first image data being processed by the multi function printer 3 has been retrieved as a result of a search process performed by the first search section 42*d*, third image data processed by the multi function printer 3 at the same time or at substantially the same time as the second image data was processed by the multi function printer 3 (i.e., image data highly likely to be relevant to the second image data) is retrieved as a result of a search process performed by the second search section 42*e*.

With this, the second image data sharing a common attribute with the first image data is retrieved in the search process performed by the first search section 42*d*. Moreover, by the search process performed by the second search section 42*e* thereafter, the third image data highly likely to be relevant to the second image data may be retrieved. Since the second image data shares a common attribute with the first image data by which the search process is performed, the third image data highly likely to be relevant to the second image is of course highly likely to also share a common attribute with the first image data.

Therefore, even in cases where there is actually a search omission although the first search section 42*d* has successfully extracted the second image data sharing a common attribute with the first image data being processed by the multi function printer 3, the third image data highly likely to share a common attribute with the first image data may be extracted by a search performed by the second search section 42*e* thereafter. This makes it possible to prevent a search omission.

Figure 7:
FIG. 7(a) shows an image, indicated by the image data that is processed by the multi function printer of the present embodiment, which differs from the images of FIGS. 6(a) and 6(b).
FIG. 7(b) shows an example of an image sharing a common attribute with the image shown in FIG. 7(a).

For example, assume that image data indicative of an image shown in FIG. 7(*a*) is being processed by the multi function printer 3 and that image data indicative of an image shown in FIG. 7(*b*) is stored in the storage section 41. The images share a common attribute with each other in that they both relates to golf, but differ from each other in that while the image data indicative of the image shown in FIG. 7(*a*) is associated with keywords "golf competition", the image data indicative of the image shown in FIG. 7(*b*) is associated with keywords "golf gear advertisement". Also assume that the image data of FIG. 7(*b*) corresponds management information indicated by Referential Mark a.

In this case, the first search section 42*d* performs a search process in accordance with the keywords "golf competition" of the image of FIG. 7(*a*) being processed by the multi function printer 3, and therefore can retrieve image data corresponding to management information indicated by Referential Marks β and γ in FIG. 2 but cannot retrieve the image data corresponding to the management information indicated by Referential Mark a. However, as shown in FIG. 2, the image data corresponding to the management information indicated by Referential Marks γ and the image data corresponding to the management information indicated by Referential Mark a were processed by the multi function printer 3 at substantially the same time (with a time lag of one minute). Therefore, the image data corresponding to the management information indicated by Referential Mark a is also retrieved as a result of a search performed by the second search section 42*e*. With this, in cases where the image shown in FIG. 7(*a*) is being processed by the multi function printer 3, the image shown in FIG. 7(*b*) can be extracted by a search even when the keywords "golf competition" associated with the image shown in FIG. 7(*a*) differ from the keywords "golf gear advertisement" associated with the image shown in FIG. 7(*b*).

Further, for example, assume that image data indicative of an image shown in FIG. 6(*a*) is being processed by the multi function printer 3 and that image data indicative of an image shown in FIG. 6(*b*) is stored in the storage section 41. The images share a common attribute with each other in that they both relates to "YY MTG", but differ from each other in that while the image data indicative of the image shown in FIG. 6(*a*) is associated with keywords "YY MTG", the image data indicative of the image shown in FIG. 6(*b*) is associated with keywords "MTG material". Also assume that the image data of FIG. 6(*b*) corresponds management information indicated by Referential Mark ε.

In this case, the first search section 42*d* performs a search process in accordance with the keywords "YY MTG" of the image of FIG. 6(*a*) being processed by the multi function printer 3, and therefore can retrieve image data corresponding to management information indicated by Referential Marks μ and φ in FIG. 2 but cannot retrieve the image data corresponding to the management information indicated by Referential Mark ε. However, as shown in FIG. 2, the image data corresponding to the management information indicated by Referential Marks φ and the image data corresponding to the management information indicated by Referential Mark ε were processed by the multi function printer 3 at substantially the same time (with a time lag of one minute). Therefore, the management information indicated by Referential Mark ε is also retrieved as a result of a search performed by the second search section 42*e*. With this, in cases where the image shown in FIG. 6(*a*) is being processed by the multi function printer 3, the image shown in FIG. 6(*b*) can be extracted by a search even when the keywords "YY MTG" associated with the image shown in FIG. 6(a) differ from the keywords "MTG material" associated with the image shown in FIG. 6(b).

Figure 5:
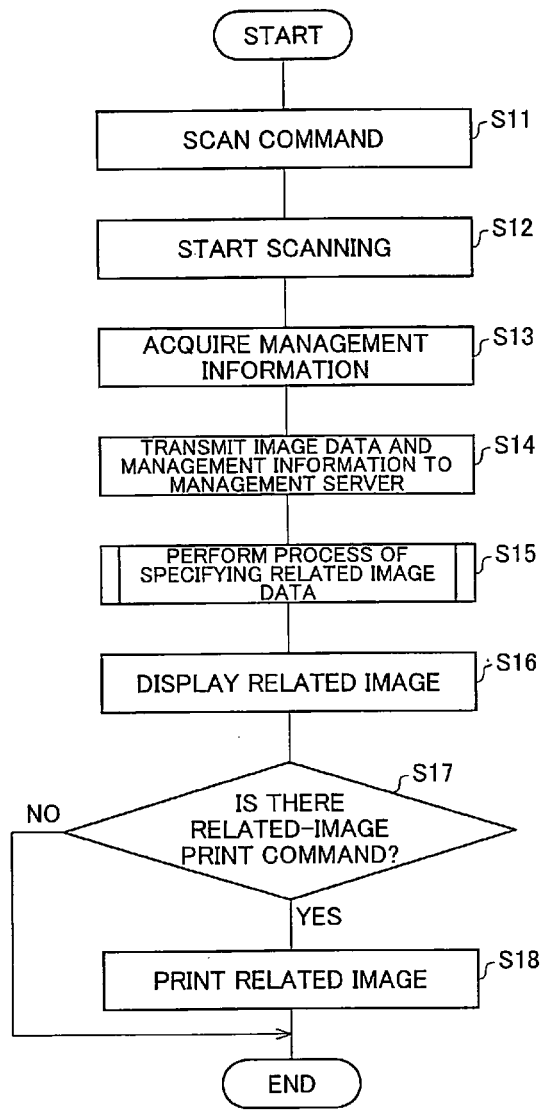
FIG. 5 is a flow chart showing the flow of a process of executing an image scanning mode in the printing system of the present embodiment.

The foregoing has described the flow of a process of executing the print mode in the multi function printer 3. The following describes the flow of a process of executing the image scanning mode in the multi function printer 3. FIG. 5 is a flow chart showing the flow of a process of executing the image scanning mode in the printing system 1.

First, upon receiving a scan command inputted by a user (S11), the multi function printer 3 controls the image scanning section 32 so that the image scanning section 32 starts scanning an image of an original document placed on the platen (not shown) (S12). Then, when image data is generated by the image scanning section 32 scanning the image of the original document, the multi function printer 3 acquires management information (an document ID, a user ID, processing time information, processing content information, and security information) that is associated with the image data thus generated (S13). Next, the multi function printer 3 transmits, to the management server 4, the image data obtained from the image of the original document and the management information acquired in S13 (S14).

Upon receiving the image data and the management information from the multi function printer 3, the management server 4 performs a process (related-image-data specifying process) of specifying, from among those pieces of image data saved in the storage section 41, related image data related in content to the image data thus received (S15). Then, the management server 4 accesses the display section 31b of the multi function printer 3 and controls the display section 31b so that the display section 31b displays an image that is based on the related image data specified in S15 (S16).

When a related-image print command serving as a printing instruction to print an image being displayed by the display section 31b is inputted to the multi function printer 3 by the user while the display section 31b is displaying the image that is based on the related image data, the related-image print command is transmitted from the multi function printer 3 to the management server 4. When the management server 4 receives the related-image print command within a predetermined period of time after the start of processing of S16 (YES in S17), the management server 4 transmits, to the multi function printer 3, a print job for printing the image that is based on the related image data specified in S15 and controls the multi function printer 3 so that the multi function printer 3 prints the image that is based on the related image data (S18). Thereafter, the process is terminated. Alternatively, when the management server 4 does not receive the related-image print command within a predetermined period of time after the start of S16 (NO in S17), the process is terminated.

The related-image-data specifying process of S15 in the process flow shown in FIG. 5 is identical in detail to the related-image-data specifying process of S5 shown in FIG. 3, i.e., identical to S51 to S58 shown in FIG. 4. The process flow shown in FIG. 5 is directed at the image scanning mode. However, on the assumption that S11 and S12 are procedures for an image scanning operation in the copy mode, the process flow shown in FIG. 5 becomes equivalent to a process flow directed at the copy mode.

Further, as described above, the management information acquisition section 36a of the multi function printer 3 acquires a document ID from image data being processed by the multi function printer 3. In cases where the multi function printer 3 executes the print mode or the copy mode, the multi function printer 3 may print, over an image that is to be printed by the printing section 33, a mark indicative of a document ID acquired from image data indicative of the image. In the print mode, the "image that is to be printed by the printing section 33" means an "image indicated by image data transmitted from the terminal device 2". In the copy mode, the "image that is to be printed by the printing section 33" means an "image indicated by image data generated by the image scanning section 32.

Further, examples of the mark indicative of the document ID include a QR Code®, a bar code, and a watermark.

For example, in cases where image data indicative of a document "Invitation to a Golf Competition" is transmitted from the terminal device 2 to the multi function printer 3 in the printing system 1 in which the print mode is in execution, the control section 36 of the multi function printer 3 generates a document ID in accordance with the image data, and then inputs the image data and the document ID to the printing section 33. Then, in accordance with the image data and the document ID thus inputted, the printing section 33 prints the document "Invitation to a Golf Competition" and a QR Code® indicative of the document ID so that the QR Code® is superimposed on the document as shown in FIG. 7(a).

Furthermore, in cases where the document thus printed (the document of FIG. 7(a)) is placed on the platen of the image scanning section 32 and the document "Invitation to a Golf Competition" is scanned by the image scanning section 32 after shifting the multi function printer 3 to the image scanning mode, the multi function printer 3 can read not only the image data indicative of the document "Invitation to a Golf Competition" but also the QR Code® indicative of the document ID.

Accordingly, in cases where a QR Code® indicative of a document ID can be read at the same time as image data is generated as shown in FIG. 7(a) in the image scanning mode, the management information acquisition section 36a of the multi function printer 3 does not generate another document ID that is associated with the image data thus generated, and associates, with the image data, the document ID indicated by the QR Code® thus read by scanning such an original document.

With this, in cases where the multi function printer 3 scans an image printed by the multi function printer 3, image data processed by the multi function printer 3 at the time of printing and image data processed by the multi function printer 3 at the time of scanning are identical in content to each other. This makes it possible to associate an identical document ID with the pieces of image data.

Therefore, when the first search section 42d of the management server 4 is arranged to search the storage section 41 for image data associated with a document ID identical to a document ID associated with image data received from the multi function printer 3 (i.e., image data being processed by the multi function printer 3), the first search section 42d can retrieve image data sharing a common attribute with the image data being processed by the multi function printer 3.

That is, since a document ID is an identifying code that is uniquely given to image data in accordance with the content of an image, two pieces of image data sharing a common document ID with each other are highly likely to indicate an identical image. Therefore, in cases where the first search section 42d performs a search in accordance with a document ID as described above, the first search section 42d searches for image data sharing a common attribute with image data being processed by the multi function printer 3.

For example, assume that when Mr. Iguchi prints an image of FIG. 7(a) at 9:00 on October 29 (the image having a QR code, indicative of the document ID "001", superimposed thereon), image data indicative of the image is saved in the management server 4 and management information (document ID "001") that is associated with the image data is written to the management table. Then, assume that the original document printed by Mr. Iguchi is handed to Mr. Tanaka and Mr. Tanaka operates the multi function printer 3 so that the multi function printer 3 scans an image of the original document at 10:00 on October 30. At this time, the QR code indicative of the document code ID "001" is scanned simultaneously with the image data. Therefore, the document ID "001" is associated with the image data scanned by the multi function printer 3. Upon receiving the image data scanned by the multi function printer 3, the first search section 42d of the management server 4 searches for image data whose document ID is identical to the document ID "001" of the image data, and therefore can retrieve, from the storage section 41, image data which indicates an image identical to the image scanned by the multi function printer 3 and which was processed when Mr. Iguchi performed the printing with use of the multi function printer 3 in the past.

Further, the control section 42 of the management server 4 may record, in the storage section 41, a table that gives a description of correspondence between a document ID associated with image data used for print processing and a user ID of a user who operated the multi function printer 3 in accordance with the image data. An example of such a table is shown in FIG. 8.

In the table shown in FIG. 8, each of the open circles means that "a user of a user ID belonging to a column of the open circle used the multi function printer 3 to print an image that is based on image data associated with a document ID belonging to a line of the open circle". Further, in the table shown in FIG. 8, each of the shaded circles indicates a "document ID of another image printed by a user who printed an image corresponding to the document ID '001'".

In cases where there are a large number of users who printed two images different from each other, the two images are considered to be highly likely to be relevant in content to each other. This is because a plurality of images related to one another are highly likely to be printed by an identical person. In this regard, the table of FIG. 8 shows that the number of users who printed an image indicated by the document ID "001" and printed an image indicated by the document ID "003" is two, and that the number of users who printed the image indicated by the document ID "001" and printed an image indicated by the document ID "004" is two. Therefore, the image indicated by the document ID "001" and the image indicated by the document ID "003" are highly likely to be relevant to each other, and the image indicated by the document ID "001" and the image indicated by the document ID "004" are highly likely to be relevant to each other.

Further, in the above embodiment, the display control section 42f of the management server 4 controls the display section 22 of the terminal device 2 or the display section 31b of the multi function printer 3 so that the display section 22 or 31b displays an image that is based on related image data specified by the first and second search sections 42d and 42e. This enables a user to view an image retrieved as a result of a search process. In addition to the display sections 22 and 31b, the display control section 42f may control the display section 44 of the management server 4 so that the display section 44 displays an image, as needed.

Furthermore, the present embodiment assumes that by displaying or printing an image that is based on related image data specified by the first and second search sections 42d and 42e, the image is provided to a user. However, the mode in which the image data is provided to the user is not limited to the displaying or printing. For example, the management server 4 may be provided with a transmitting section (image transmitting means) for, when the first and second search sections 42d and 42f specify related image data, transmitting the related image data to a terminal device 2 of the user who is using the multi function printer 3. This makes it possible to transmit, to the terminal device 2 of the user, the related image data retrieved as a result of the search. Therefore, even in cases where the user is away from the management server 4 and the multi function printer 3, the related image data can be transmitted to the terminal device 2 of the user and then stored in the terminal device 2 of the user.

Further, when the first and second search sections 42d and 42e specify related image data, the display control section 42f may operates the display sections 22 and 31b so that the display sections 22 and 31b display an image indicating "RELATED IMAGE DATA FOUND". This arrangement enables the user to know that the management server 4 stocks related image data related to image data being processed by the multi function printer 3.

Further, when the display control section 42f controls the display section 22 or 31b so that the display section 22 or 31b displays an image that is based on related image data, the display control section 42f does not need to control the display section 22 or 31b so that the display section 22 or 31b displays images based on all related image data specified by the first and second search section 42d and 42e. Instead, the display control section 42f may select a portion of all the related image data as related image data that is to be preferentially displayed, and may control the display section 22 or 31b so that the display section 22 or 31b displays only an image that is based on the selected portion. With this, in cases where there are too many pieces of image data retrieved by the first and second search sections 42d and 42f, the display section 22 or 31b displays only an image that is based on image data of relatively high priority. This makes it possible to save the user the trouble of checking images.

The "related image data that is to be preferentially displayed" is selected according to a predetermined priority rule. Possible examples of the priority rule include such a rule that a related image specified by the first search section 42d is given higher priority than a related image specified by the second search section 42e and such a rule that image data processed by the multi function printer 3 most recently is given high priority.

Further, when the display control section 42f prevents the display sections 22 and 31b from displaying an image that is based on related image data whose security information indicates "SECURITY REQUIRED" as shown in FIG. 2, it is possible to prevent a highly confidential image from being unnecessarily displayed.

Furthermore, in cases where security information corresponding to related image data indicates "SECURITY REQUIRED", the display control section 42f controls the display section 22 or 31b so that the display section 22 or 31b displays an image that requires the user to input a password. Only in cases where the user inputs the password into the terminal device 2 or the input section 31a of the multi function printer 3, the display control section 42f controls the display section 22 or 31b so that the display section 22 or 31b displays an image that is based on the related image data. This makes it possible to show a highly confidential image only to an authorized user.

Further, the first search section 42d may search the storage section 41 for image data identical in data amount to the image data being processed by the multi function printer 3. This is because such a process also makes it possible to search for image data sharing a common attribute with the image data being processed by the multi function printer 3. This is because two pieces of image data identical in data amount (byte) to each other are highly likely to be identical to each other. Specifically, when the image data being processed by the multi function printer 3 is transmitted to the management server 4, the first search section 42d searches the storage section 41 for image data identical in data amount to the image data.

Further, the probability that two pieces of image data are identical to each other is high if the conditions are fulfilled as follows: (1) the two pieces of image data are document data; and (2) a comparison between the two pieces of image data shows (i) that they are identical in total data amount to each other, (ii) that pages indicated by the same page number are identical in data amount to each other, and (iii) that such a relationship as described in the clause (ii) applies to all the page numbers. For example, in cases where a comparison between two pieces of document data shows that each of them contains three pages, that respective first pages of them are identical in data amount to each other, that respective second pages of them are identical in data amount to each other, and that respective third pages of them are identical in data amount to each other, chances are good that the two pieces of document data are identical to each other. Therefore, if the first search section 42d is arranged to search for image data that fulfils the clauses (i) to (iii) as compared with the image data being processed by the multi function printer 3, the first search section 42d can highly accurately retrieve image data identical to the image data being processed by the multi function printer 3.

Further, in the printing system 1 of the present embodiment, the reception of a related-image print command from a user via the multi function printer 3 or the terminal device 2 serves as a trigger for the printing instruction section 42g of the management server 4 to transmit, to the multi function printer 3, a print job indicative of an instruction to print an image that is based on the related image data. However, the printing system 1 of the present embodiment is not limited to such a trigger. It is also possible that as soon as the first and second search sections 42d and 42e specifies related image data, the printing instruction section 42g does not wait for a related-image print command and transmits, to the multi function printer 3, a print job indicative of an instruction to print an image that is based on the related image data.

Further, in the printing system 1 of the present embodiment, the management information acquisition section 36a is provided in the control section 36 of the multi function printer 3. However, the control section 21 of the terminal device 2 may be also provided with a management information acquisition section. In the print mode, before the terminal device 2 transmits image data to the multi function printer 3, the terminal device 2 may generate a document ID, a user ID, processing content information, security information, processing time information (i.e., a point of time at which the image data is transmitted to the multi function printer 3) that are associated with the image data, and may transmit the image data to the multi function printer 3 together with the IDs and information thus generated.

The possibility that two pieces of image data share a common attribute with each other is extremely high if the two pieces of image data were processed by the multi function printer 3 at the same time or at substantially the same time and if the multi function printer 3 was used by the same user in handling the two pieces of image data. This is because a user of the multi function printer 3 often operates the multi function printer 3 so that the multi function printer 3 processes plural pieces of image data related in content to one another.

In view of this, it is preferable that the second search section 42e search the storage section 41 for image data that fulfils both of the following conditions (A) and (B).

(A) Image data processed by the multi function printer 3 within a time period from a predetermined time before a reference time to a predetermined time after the reference time, the reference time being a point of time at which image data retrieved by the first search section 42d was processed by the multi function printer 3.

(B) Image data associated with a user ID identical to an user ID associated with the image data retrieved as a result of a search performed by the first search section 42d.

This makes it possible to highly accurately search for image data highly likely to be relevant to the image data retrieved as a result of the search performed by the first search section 42d.

Further, in cases where plural pieces of image data are retrieved as a result of a search performed by the first search section 42d, it is preferable that in relation to all the pieces of image data retrieved as a result of the search performed by the first search section 42d, the second search section 42e search the storage section 41 for image data processed by the multi function printer 3 within a time period from a predetermined time before the reference time to a predetermined time after the reference time. That is, it is preferable that when plural pieces of image data are retrieved as a result of a search performed by the first search section 42d, the second search section 42e search the storage section 41 for third image data, the third image data being image data processed by the multi function printer 3 (i) within a time period from a predetermined time before a first reference time to a predetermined time after the first reference time and (ii) within a time period from a predetermined time before a second reference time to a predetermined time after the second reference time, the first reference time being a point of time at which one of the pieces of image data was processed by the multi function printer 3, the second reference time being a point of time at which another one of the pieces of image data was processed by the multi function printer 3. This makes it possible to improve search accuracy.

Further, in the printing system 1 of the present embodiment, the second search section 42e of the management server 4 searches for image data processed by the multi function printer 3 between (i) a point of time at which a predetermined period of time (one minute) has elapsed since a reference time and (ii) a point of time to which a predetermined period of time (one minute) extends back from the reference time, the reference time being a point of time at which the multi function printer 3 processed image data retrieved by the first search section 42d. This makes it possible to perform a search within a period of time before and after the reference time, instead of a period of time before or after the reference time. This enables a more accurate search.

The predetermined period of time is not limited to one minute. The predetermined period of time can be changed unless a disadvantage of causing search noise overtakes an advantage of preventing a search omission. It is considered that the predetermined period of time can be changed within a range of 0 minute to 5 minutes.

Further, the second search section 42e may be arranged to search for only image data processed by the multi function printer 3 between the reference time and a point of time at which a predetermined period of time (one minute) has elapsed since the reference time. Furthermore, the second search section 42e may be arranged to search for image data processed by the multi function printer 3 between the reference time and a point of time at which a predetermined period of time (one minute) has elapsed since the reference time, and to search for image data processed by the multi function printer 3 between the reference time and a point of time to which a different period of time (e.g., two minutes) extends back from the reference time. In either case, the second search section 42e searches for at least image data processed by the multi function printer 3 within a time period from a predetermined time before the reference time to a predetermined time after the reference time.

Further, the second search section 42e may be arranged to search for only image data processed by the multi function printer 3 at the same time as image data retrieved by the first search section 42d. Even in such a case, the second search section 42e searches for at least image data processed by the multi function printer 3 within a time period from a predetermined time before the reference time to a predetermined time after the reference time. Further, in such a case, it is considered that search noise can be minimized.

Further, in cases where image data printed together (group printing) with image data retrieved by the first search section 42d is stored in the storage section 41, the second search section 42e may retrieve the image data printed together. The term "group printing" here means that a plurality of different images are printed collectively. The image data printed together (group printing) with image data retrieved by the first search section 42d is processed by the multi function printer 3 at the same time as the image data retrieved by the first search section 42d. Such a search technique makes it unnecessary for the second search section 42e to refer to the processing time information of FIG. 2 in searching for such image data as processed by the multi function printer 3 within a time period from a predetermined time before the reference time to a predetermined time after the reference time.

Furthermore, the predetermined period of time may be set in default by a manufacturer of the printing system 1 at the time of manufacture or factory shipment, or may be set in default by a service engineer at the time of installation in a user's office or the like.

Further, the predetermined period of time may be changed in accordance with an input command inputted to the management server 4 by an operator of the management server 4. This enables the user to adjust the predetermined period of time to an appropriate value in accordance with the conditions in which the multi function printer 3 and the storage section 41 of the management server 4 are used.

Further, in the present embodiment, the first search section 42d is arranged to perform a real-time search of image data sharing a common attribute with image data (first image data) being processed by the multi function printer 3. However, the first search section 42d is not limited to such an arrangement. The first search section 42d may regards the first image data as image data about to be processed by the multi function printer 3 or as image data just processed by the multi function printer 3.

Furthermore, in the printing system 1 of the present embodiment, the multi function printer 3 is an image processing apparatus having a scan function, a print function, a facsimile function, and an image transmitting and receiving function. However, the multi function printer 3 does not need to include all of the functions. The multi function printer 3 only needs to be an image processing apparatus having at least one of the functions. That is, the image processing apparatus of the present invention does not need to be a multi function printer, and may be a facsimile machine, a scanner, a laser printer, an ink jet printer, a copier, or a photograph printing apparatus that exposes a photographic printing paper to a laser.

Further, although there is provided only one multi function printer 3 in the printing system 1 of the present embodiment, there may be provided a plurality of multi function printers 3. Furthermore, the LAN provided in the printing system 1 of the present embodiment may be either a cable LAN or a wireless LAN. Further, the means by which the terminal device 2, the multi function printer 3, and the management server 4 are connected to one another is not limited to the LAN, and may be a communication network other than the LAN. Usable examples of such a communication network include the Internet, an intranet, an extranet, ISDN, VAN, a CATV communication network, and a virtual private network. Further, usable examples of a transmission medium that constitutes the communication network include, but are not limited to, IEEE 1394, USB, power line communication, CATV lines, infrared radiation as used in IrDA and remote controllers, Bluetooth®, and 802.11 Wireless.

In the printing system 1 described above, examples of the display sections 22, 31b, and 44 include display devices such as CRTs (cathode-ray tubes), liquid crystal display devices, plasma displays, organic EL (electroluminescence) displays, and inorganic EL displays.

Further, in the printing system 1 of the present embodiment, the components (especially, the first and second search section 42d and 42e, the display control section 42f, and the printing instruction section 42g) of the control section 42 do not need to be contained in the control section 42 of the management server 4, and may be contained either in the control section 36 of the multi function printer or in the control section 21 of the terminal device 2. In cases where the components of the control section 42 of the management server 4 are contained in the control section 36 of the multi function printer 3, the multi function printer 3 serves as an embodiment of the search device of the present invention. In cases where the components of the control section 42 of the management server 4 are contained in the control section 21 of the terminal device 2, the terminal device 2 serves as an embodiment of the search device of the present invention.

Furthermore, in the printing system 1 of the present embodiment, examples of the storage section 41 include external or built-in hard disk drives and ROMs (read-only memories). Further, the storage section 41 does not need to be provided in the management server 4, and may be provided either in the multi function printer 3 or in the terminal device 2. Further, the storage section 41 may be a hard disk drive connected directly to the LAN of the printing system 1.

Further, in the printing system 1 described above, each of the control sections 21, 36, and 42 is constituted by a PC-based computer. Moreover, various processes in the control sections 21, 36, and 42 are performed by causing a computer to execute a program. The program may be recorded in a removable medium (computer-readable recording medium) such as a CD-ROM and read out for use, or may be installed in a hard disk and read out for use. Alternatively, in cease where the control sections 21, 36, and 42 are connected to a communication network such as the Internet, the program may be downloaded via the communication network so as to be installed in a hard disk for execution.

A search device of the present invention includes: a first search section for searching, for second image data sharing a common attribute with first image data, a storage section in which image data processed by an image processing apparatus is stored; and a second search section for searching the storage section for third image data processed by the image processing apparatus within a time period from a predetermined time before a reference time to a predetermined time after the reference time, the reference time being a point of time at which the second image data was processed by the image processing apparatus.

That is, according to the arrangement of the present invention, the search device having the first search section for searching for the second image data sharing a common attribute with the first image data has the second search section for searching for the third image data (i.e., the image data highly likely to be relevant to the second image data) processed by the image processing apparatus at the same time or at substantially the same time as the second image data was processed by the image processing apparatus.

This may make it possible not only to retrieve the second image data sharing a common attribute with the first image data, but also to retrieve the third image data highly likely to be relevant to the second image data. Since the second image data shares a common attribute with the first image data, the third image data highly likely to be relevant to the second image data is highly likely to also share a common attribute with the first image data.

Therefore, in such a case where although the first search section has extracted the second image data sharing a common attribute with the first image data, there is actually an omission in the search performed by the first search section, the second search section may be able to extract the third image data highly likely to be relevant to the second image data. This makes it possible to prevent a search omission.

Further, the search device of the present invention is preferably arranged such that: each piece of image data stored in the storage section and the first image data are associated with keywords indicative of attributes of images indicated by the piece of image data stored in the storage section and the first image data, respectively; and the first search section searches the storage section for the second image data, the second image data being image data associated with a keyword identical to the keyword associated with the first image data.

This makes it possible for the first search section to search, for the second image data sharing a common attribute with the first image data, the storage section in which image data processed by the image processing apparatus is stored.

Further, the search device of the present invention is preferably arranged such that the first search section searches the storage section for the second image data, the second image data being image data indicative of an image identical in format to an image indicated by the first image data.

If two pieces of image data are identical in format to each other, the two pieces of image data can be said to share a common attribute with each other. Therefore, according to the foregoing arrangement, the first search section searches, for the second image data sharing a common attribute with the first image data, the storage section in which image data processed by the image processing apparatus is stored.

Further, the search device of the present invention is preferably arranged such that: each piece of image data stored in the storage section and the first image data are associated with image identification information for identifying images indicated by the image data stored in the storage section and the first image data, respectively; and the first search section searches the storage section for the second image data, the second image data being image data associated with image identification information identical to the image identification information associated with the first image data.

In this arrangement, image identification information associated with image data is unique to the content of an image indicated by the image data; therefore, an image indicated by the image data associated with the image identification information identical to the image identification information associated with the first image data is highly likely be identical to an image indicated by the first image data. Therefore, according to the foregoing arrangement, the first search section searches, for the second image data sharing a common attribute with the first image data, the storage section in which image data processed by the image processing apparatus is stored.

Further, the search device of the present invention is preferably arranged such that the first search section searches the storage section for the second image data, the second image data being image data identical in data amount to the first image data.

If two pieces of image data are identical in data amount (byte) to each other, the two pieces of image data are highly likely to be identical to each other. Therefore, according to the foregoing arrangement, the first search section searches, for the second image data sharing a common attribute with the first image data, the storage section in which image data processed by the image processing apparatus is stored.

Further, the search device of the present invention is preferably arranged such that the second search section searches for the third image data, the third image data being image data processed by the image processing apparatus at a point of time identical to the reference time.

According to the foregoing arrangement, the third image data is image data processed by the image processing apparatus at a point of time identical to the reference time. This makes it possible to minimize search noise, thereby enabling a more accurate search.

Further, the search device of the present invention is preferably arranged such that each of the predetermined times is able to be changed in accordance with an input command given from an operator.

This makes it possible to adjust the predetermined period of time to an appropriate value in accordance with the conditions in which the storage section and the image forming apparatus are used.

Further, the search device of the present invention is preferably arranged such that the first image data is image data being processed by the image processing apparatus.

This makes it possible to perform a real-time search of the second image data sharing a common attribute with the first image data being processed by the image forming apparatus.

Further, the search device of the present invention is preferably arranged such that: each piece of image data stored in the storage section and the first image data are associated with user information indicative of users who used the image processing apparatus in processing the image data stored in the storage section and the first image data, respectively; and the second search section searches the storage section for the third image data, the third image data being image data (i) processed by the image processing apparatus within the time period from the predetermined time before the reference time to the predetermined time after the reference time and (ii) associated with user information identical to the user information associated with the first image data.

The possibility that two pieces of image data share a common attribute with each other is extremely high if the two pieces of image data were processed by the image processing apparatus at the same time or at substantially the same time and if the image processing apparatus was used by the same user in handling the two pieces of image data. This is because a user of the image processing apparatus often operates the image processing apparatus so that the image processing apparatus processes plural pieces of image data related in content to one another. Therefore. the foregoing arrangement makes it possible to more highly accurately search for the third image data related to the second image data retrieved as a result of the search performed by the first search section.

Further, the search device of the present invention is preferably arranged such that when plural pieces of second image data are retrieved as a result of a search performed by the first search section, the second search section searches the storage section for the third image data in relation to all the pieces of second image data, the third image data being image data by the image processing apparatus within a time period from a predetermined time before the reference time to a predetermined time after the reference time. That is, the search device of the present invention is preferably arranged such that when plural pieces of second image data are retrieved as a result of a search performed by the first search section, the second search section searches the storage section for the third image data, the third image data being image data processed by the image processing apparatus (i) within a time period from a predetermined time before a first reference time to a predetermined time after the first reference time and (ii) within a time period from a predetermined time before a second reference time to a predetermined time after the second reference time, the first reference time being a point of time at which one of the pieces of second image data was processed by the image processing apparatus, the second reference time being a point of time at which another one of the pieces of second image data was processed by the image processing apparatus According to the foregoing arrangement, the third image data is not searched for as image data processed by the image processing apparatus within a time period from a predetermined time before the reference time to a predetermined time after the reference time in comparison with a single piece of second image data, but searched for as image data processed by the image processing apparatus within a time period from a predetermined time before the reference time to a predetermined time after the reference time in comparison with plural pieces of second image data. This makes it possible to further improve search accuracy.

Further, the search device of the present invention is preferably arranged so as to further include an image providing section for providing a user with at least either the second image data or the third image data.

Examples of the image providing section include an image transmitting section for transmitting at least either the second image data or the third image data to a terminal device of the user.

This makes it possible to transmit, to the terminal device of the user, at least either the second image data or the third image data that have been retrieved as a result of the search, thereby providing at least either the second image data or the third image data to the user even in cases where the user is away from the search device and the multi function printer.

Further, another example of the image providing section include a display control section for controlling a display device so that the display device displays at least either an image that is based on the second image data or an image that is based on the third image data.

This enables the user to view either the image that is based on the second image data or the image that is based on the third image data.

Further, the search device of the present invention is preferably arranged such that: when plural pieces of image data are retrieved as a result of a search performed by the first search section and the second search section, the display control section selects at least a piece of image data from the plural pieces of image data in accordance with a predetermined priority rule; and the display control section controls the display device so that the display device displays only an image based on the piece of image data thus selected.

According to the foregoing arrangement, in cases where there are too many pieces of image data retrieved as a result of the search, only an image based on image data of relatively high priority is displayed. This makes it possible to save the user the trouble of checking images.

Further, the search device of the present invention is preferably arranged such that when at least either the second image data or the third image data is associated with security information indicating that security is required, the display control section prevents the display device from displaying an image that is based on the image data associated with the security information.

With this, even if either the second image data or the third image data indicates a highly confidential image, the display device can be prevented from unnecessarily display the highly confidential information.

Further, the search device of the present invention is preferably arranged such that: when at least either the second image data or the third image data is associated with security information indicating that security is required, the display control section requires a user to input a password; and only when the password has been inputted, the display control section controls the display device so that the display device displays an image that is based on the image data associated with the security information.

With this, even if either the second image data or the third image data indicates a highly confidential image, the highly confidential image can be shown only to an authorized user.

Further, the search device of the present invention is preferably arranged such that: the image processing apparatus has a print function; and the image providing section is a print control section for transmitting, to the image processing apparatus, a print job indicative of an instruction to print at least either an image that is based on the second image data or an image that is based on the third image data.

This enables the user to print out at least either the image that is based on the second image data or the image that is based on the third image data.

Further, in the search device of the present invention, the image processing apparatus is not limited as long as the image processing apparatus handles digital image data. Examples of the image processing apparatus may include a multi function printer, a scanner, a copier, a laser printer, an ink jet printer, and a photograph printing apparatus (digital exposure apparatus).

The search device of the present invention may be a computer separate from the image processing apparatus, or may be a computer constituted by the image processing apparatus.

Further, the storage section may be a storage device contained in the search device, or may be a storage device contained in the image processing apparatus. Alternatively, in cases where the search device and the image forming apparatus are connected to each other via a network, the storage section may be a hard disk drive connected to the network.

Further, the scope of the present invention encompasses a search system including the search device, the image forming apparatus, and the storage section.

Further, the scope of the present invention also encompasses a method for controlling a search device for searching for image data in a storage section in which image data processed by an image processing apparatus is stored, the method causing a control section of the search device to carry out the steps of: searching the storage section for second image data sharing a common attribute with first image data; and searching the storage section for third image data processed by the image processing apparatus within a time period from a predetermined time before a reference time to a predetermined time after the reference time, the reference time being a point of time at which the second image data was processed by the image processing apparatus.

The search device of the present invention may be a computer. In such a case, the scope of the present invention also encompasses a program for controlling a search device for searching for image data in a storage section in which image data processed by an image processing apparatus is stored, the program causing a control section of the search device to carry out the steps of: searching the storage section for second image data sharing a common attribute with first image data; and searching the storage section for third image data processed by the image processing apparatus within a time period from a predetermined time before a reference time to a predetermined time after the reference time, the reference time being a point of time at which the second image data was processed by the image processing apparatus. Further, the scope of the present invention also encompasses a computer-readable recording medium in which the control program is recorded.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. A search device comprising:
a first search section for searching, for second image data sharing a common image attribute with first image data being processed by a multi-function printer, a storage section in which image data processed by the multi-function printer is stored;
a second search section for setting a reference time as a point of time at which the second image data was processed by the multi-function printer, searching the storage section for third image data processed by the multi-function printer within a time period from a predetermined time before the reference time to a predetermined time after the reference time; and
a display control section for causing a display section to display, as a related image related to an image based on the first image data, (i) an image based on the second image data searched for by the first search section, and (ii) an image based on the third image data searched for by the second search section;
wherein
when plural pieces of second image data are retrieved as a result of a search performed by the first search section, the second search section searches the storage section for the third image data, the third image data being image data processed by the multi-function printer
(i) within a time period from a predetermined time before a first reference time to a predetermined time after the first reference time and (ii) within a time period from a predetermined time before a second reference time to a predetermined time after the second reference time,
the first reference time being a point of time at which one of the pieces of second image data was processed by the multi-function printer, and
the second reference time being a point of time at which another one of the pieces of second image data was processed by the multi-function printer.

2. The search device as set forth in claim 1, wherein:
each piece of image data stored in the storage section and the first image data are associated with keywords indicative of attributes of images indicated by the piece of image data stored in the storage section and the first image data, respectively; and
the first search section searches the storage section for the second image data, the second image data being image data associated with a keyword identical to the keyword associated with the first image data.

3. The search device as set forth in claim 1, wherein
the first search section searches the storage section for the second image data, the second image data being image data indicative of an image identical in format to an image indicated by the first image data.

4. The search device as set forth in claim 1, wherein:
each piece of image data stored in the storage section and the first image data are associated with image identification information for identifying images indicated by the image data stored in the storage section and the first image data, respectively; and
the first search section searches the storage section for the second image data, the second image data being image data associated with image identification information identical to the image identification information associated with the first image data.

5. The search device as set forth in claim 1, wherein
the first search section searches the storage section for the second image data, the second image data being image data identical in data amount to the first image data.

6. The search device as set forth in claim 1, wherein
the second search section searches for the third image data, the third image data being image data processed by the multi-function printer at a point of time identical to the reference time.

7. The search device as set forth in claim 1, wherein each of the predetermined times is changed in agreement with an input command given from an operator.

8. The search device as set forth in claim 1, wherein:
each piece of image data stored in the storage section and the first image data are associated with user information indicative of users who used the multi-function printer in processing the image data stored in the storage section and the first image data, respectively; and
the second search section searches the storage section for the third image data, the third image data being image data (i) processed by the multi-function printer within the time period from the predetermined time before the reference time to the predetermined time after the reference time and (ii) associated with user information identical to the user information associated with the first image data.

9. The search device as set forth in claim 1, further comprising
an image transmitting section for transmitting at least either the second image data or the third image data to a terminal device of the user.

10. The search device as set forth in claim 1, wherein:
when plural pieces of image data are retrieved as a result of a search performed by the first search section and the second search section, the display control section selects at least a piece of image data from the plural pieces of image data in accordance with a predetermined priority rule; and
the display control section controls the display device so that the display device displays only an image based on the piece of image data thus selected.

11. The search device as set forth in claim 1, wherein when at least either the second image data or the third image data is associated with security information indicating that security is required, the display control section prevents the display device from displaying an image that is based on the image data associated with the security information.

12. The search device as set forth in claim 1, wherein:
when at least either the second image data or the third image data is associated with security information indicating that security is required, the display control section requires a user to input a password; and
only when the password has been inputted, the display control section controls the display device so that the display device displays an image that is based on the image data associated with the security information.

13. The search device as set forth in claim 1, further comprising:
a print control section for transmitting, to the multifunction printer, a print job indicative of an instruction to print at least either an image that is based on the second image data or an image that is based on the third image data, the multifunction printer having a print function.

14. A search system including
a multi-function printer,
a storage section in which image data processed by the multi-function printer is stored, and
a search device for searching the storage section for image data, the search system comprising:
a first search section for searching the storage section for second image data sharing a common image attribute with first image data being processed by the multi-function printer;
a second search section for setting a reference time as a point of time at which the second image data was processed by the multi-function printer, searching the storage section for third image data processed by the multi-function printer within a time period from a predetermined time before the reference time to a predetermined time after the reference time; and
a display section for causing a display section to display, as a related image related to an image based on the first image data, (i) an image based on the second image data searched for by the first search section, and (ii) an image based on the third image data searched for by the second search section;
wherein
when plural pieces of second image data are retrieved as a result of a search performed by the first search section, the second search section searches the storage section for the third image data, the third image data being image data processed by the multi-function printer
(i) within a time period from a predetermined time before a first reference time to a predetermined time after the first reference time and
(ii) within a time period from a predetermined time before a second reference time to a predetermined time after the second reference time,
the first reference time being a point of time at which one of the pieces of second image data was processed by the multi-function printer,
the second reference time being a point of time at which another one of the pieces of second image data was processed by the multi-function printer.

15. A method for controlling a search device for searching for image data in a storage section in which image data processed by a multi-function printer is stored, the method causing a control section of the search device to carry out the steps of:
searching the storage section for second image data sharing a common image attribute with first image data;
setting a reference time as a point of time at which the second image data was processed by the multi-function printer;
searching the storage section for third image data processed by the multi-function printer within a time period from a predetermined time before the reference time to a predetermined time after the reference time; and
displaying on a display section as a related image related to an image based on the first image data (i) an image based on the second image data, and (ii) an image based upon the third image data,
wherein
when plural pieces of second image data are retrieved as a result of said search for second image data sharing a common image attribute with first image data, the search of the storage section for third image data is a search for image data processed by the multi-function printer
(i) within a time period from a predetermined time before a first reference time to a predetermined time after the first reference time and (ii) within a time period from a predetermined time before a second reference time to a predetermined rime after the second reference time,
the first reference time being a point of time at which one of the pieces of second image data was processed by the multi-function printer, the second reference time being a point of time at which another one of the pieces of second image data was processed by the multi-function printer.

16. A non-transitory computer-readable recording medium for recording a program for controlling a search device for searching for image data in a storage section in which image data processed by a multi-function printer is stored, the non-transitory computer-readable recording medium recording a search device control program for causing a control section of the search device to carry out the steps of:
searching the storage section for second image data sharing a common image attribute with first image data;
setting a reference time as a point of time at which the second image data was processed by the multi-function printer;
searching the storage section for third image data processed by the multi-function printer within a time period from a predetermined time before the reference time to a predetermined time after the reference time; and
displaying on a display section as a related image related to an image based on the first image data (i) an image based on the second image data, and (ii) an image based upon the third image data;
wherein
when plural pieces of second image data are retrieved as a result of said search for second image data sharing a common image attribute with first image data, the search of the storage section for third image data is a search for image data processed by the multi-function printer (i) within a time period from a predetermined time before a first reference time to a predetermined time after the first reference time and (ii) within a time period from a predetermined time before a second reference time to a predetermined time after the second reference time, the first reference time being a point of time at which one of the pieces of second image data was processed by the multi-function printer, the second reference time being a point of time at which another one of the pieces of second image data was processed by the multi-function printer.

* * * * *